United States Patent [19]

Terlep et al.

[11] Patent Number: 5,796,777
[45] Date of Patent: Aug. 18, 1998

[54] APPARATUS AND METHOD FOR DIGITIZING AND DETECTING A RECEIVED RADIO FREQUENCY SIGNAL

[75] Inventors: Daniel Joseph Terlep. Crystal Lake; Robert Charles Elder. McHenry, both of Ill.

[73] Assignee: Motorola, Inc.. Schaumburg, Ill.

[21] Appl. No.: 607,752

[22] Filed: Feb. 27, 1996

[51] Int. Cl.$^6$ .............................. H04B 3/46; H04B 17/00
[52] U.S. Cl. ...................... 375/227; 455/67.1; 455/226.2
[58] Field of Search ........................... 375/227, 347, 375/349; 455/54.1, 189.1, 67.1, 226.2

[56] References Cited

U.S. PATENT DOCUMENTS

| | | | |
|---|---|---|---|
| 5,031,193 | 7/1991 | Atkinson et al. | 375/13 |
| 5,065,411 | 11/1991 | Muto | 375/100 |
| 5,203,026 | 4/1993 | Ekelund | 455/134 |
| 5,203,027 | 4/1993 | Nounin et al. | 455/134 |
| 5,251,218 | 10/1993 | Stone et al. | 370/120 |
| 5,319,677 | 6/1994 | Kim | 375/100 |
| 5,408,517 | 4/1995 | Nyhart et al. | 379/60 |
| 5,436,937 | 7/1995 | Brown et al. | 375/376 |
| 5,440,589 | 8/1995 | Kaku et al. | 375/344 |
| 5,530,926 | 6/1996 | Rozanski | 455/277.2 |
| 5,555,257 | 9/1996 | Dent | 370/95.1 |
| 5,603,088 | 2/1997 | Gorday et al. | 455/53.1 |
| 5,606,729 | 2/1997 | D'Amico et al. | 455/67.1 |
| 5,613,218 | 3/1997 | Li et al. | 455/71 |
| 5,619,525 | 4/1997 | Wiedeman et al. | 375/200 |

OTHER PUBLICATIONS

"The Benefits of Undersampling", George Hill, 69–79, Electronic Design, Jul. 11, 1994.

Primary Examiner—Stephen Chin
Assistant Examiner—Mohammad Ghayour

[57] ABSTRACT

A method including the steps of digitizing a first radio frequency signal at a first clock rate to produce a first digitized signal, digitizing a second radio frequency signal at a second clock rate to produce a second digitized signal, performing a first signal quality measurement indicative of the signal quality of the first digitized signal, performing a second signal quality measurement indicative of the signal quality of the second digitized signal, and selecting one of the first and second digitized signals based on the first and second signal quality measurements.

17 Claims, 4 Drawing Sheets

1

APPARATUS AND METHOD FOR DIGITIZING AND DETECTING A RECEIVED RADIO FREQUENCY SIGNAL

FIELD OF THE INVENTION

This invention relates generally to receiving radio frequency (RF) signals, and more particularly to digitizing and detecting received RF signals.

BACKGROUND OF THE INVENTION

In conventional wideband receivers used in wireless communication systems, multiple desired signals are carried by a single wideband signal. Such wideband receivers typically include analog to digital converters that convert the received signal into a digitized version of the received signal. Due to inherent nonlinearities in the analog to digital converters, the converters produce undesirable spurious and other intermodulation (IM) signals. If the IM signals have a frequency that overlaps the frequency of a desired signal, the sensitivity and accuracy of the wideband receiver in detecting the desired signal is degraded. Accordingly, there is a need for a more accurate method and apparatus for digitizing and detecting a received signal.

SUMMARY OF THE INVENTION

In order to address this need, the present invention provides a method and apparatus for digitizing and detecting a received signal. The method includes the steps of digitizing a first radio frequency signal at a first clock rate to produce a first digitized signal, digitizing a second radio frequency signal at a second clock rate to produce a second digitized signal, performing a first signal quality measurement indicative of the signal quality of the first digitized signal, performing a second signal quality measurement indicative of the signal quality of the second digitized signal, and selecting one of the first and second digitized signals based on the first and second signal quality measurements.

The apparatus includes a first analog to digital converter digitizing a first radio frequency signal at a first clock rate to produce a first digitized signal, a second analog to digital converter digitizing a second radio frequency signal at a second clock rate to produce a second digitized signal, a first measurement unit producing a first signal quality measurement indicative of the signal quality of the first digitized signal and producing a second signal quality measurement indicative of the signal quality of the second digitized signal, and a comparison device selecting one of the first and second digitized signals based on the first and second signal quality measurements.

According to another aspect of the present invention, a multichannel radio frequency (RF) receiver is provided. The multichannel RF receiver comprises a first digitizer, a second digitizer, a first digital down converter responsive to the first digitizer, a second digital down converter responsive to the second digitizer, and a channel processor. The first digitizer digitizes a first received multicarrier RF signal at a first clock rate to produce a first digitized signal. The second digitizer digitizes a second received multicarrier RF signal at a second clock rate to produce a second digitized signal. The first digital down converter receives the first digitized signal and produces a first digitally downconverted signal. The second digital downconverter receives the second digitized signal and produces a second digitally downconverted signal. The channel processor is responsive to the first and second digital downconverters.

2

The invention itself, together with its intended advantages will best be understood by reference to the following detailed description, taken in conjunction with the accompanying drawings.

DETAILED DESCRIPTION OF THE PREFERRED EMBODIMENTS

Figure 1:
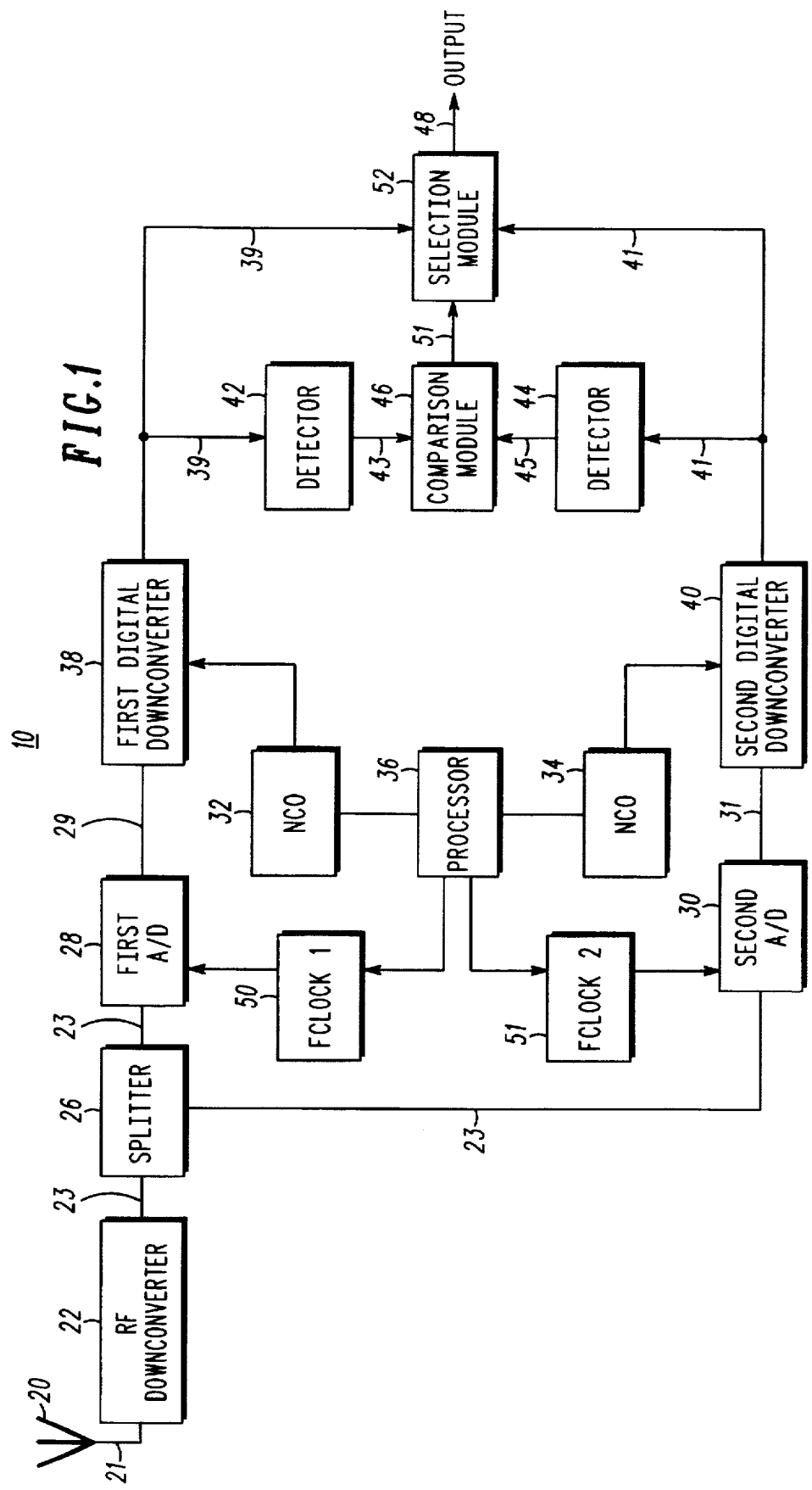
FIG. 1 is a block diagram of a particular embodiment of an apparatus for digitizing and detecting a received signal.

Referring to FIG. 1, an apparatus 10 for digitizing and detecting a received signal is illustrated. The apparatus 10 includes an antenna 20, a radio frequency down-converter 22, including conventional circuitry, such as mixers, filters, amplifiers, and oscillators (not shown), a first analog to digital (A/D) converter 28, a second analog to digital (A/D) converter 30, a first digital downconverter 38, a second digital downconverter 40, a processor 36, a first detector 42, a second detector 44, a comparison module 46, and a selection module 52. The RF downconverter 22 is responsive to the antenna 20 and is coupled to a splitter 26. The splitter 26 is coupled to the first A/D converter 28 and the second A/D converter 30. The processor 36 is coupled to the first A/D converter 28 via a numerically controlled oscillator 32 and is coupled to the second A/D converter 30 via a second numerically controlled oscillator (NCO) 34. The processor 36 is also coupled to the first digital downconverter 38 via a first clock source (fclock1) 50 and is coupled to the second digital downconverter 40 via a second clock source (fclock2) 51. Although NCOs 32 and 34 are shown as separate units, the NCOs 32, 34 may alternatively be integrated in respective first and second digital downconverters 38 and 40. The first digital downconverter 38 is coupled to the first detector 42 and is coupled to the first A/D converter 28. In a similar manner, the second digital downconverter 40 is coupled to the detector 44 and the second A/D converter 30. The first detector 42 couples the first digital downconverter 38 and the comparison module 46, and the second detector 44 couples the second digital downconverter 40 and the comparison module 46. The selection module 52 is coupled to the first DDC 38, the second DDC 40, and the comparison module 46.

During operation, a radio frequency (RF) signal 21 is received at antenna 20. The RF signal 21 is then frequency down converted by RF downconverter 22 to produce an intermediate frequency (IF) signal 23 which is fed into splitter 26. The splitter 26 produces two substantially similar versions of the IF signal 23 and feeds a first version of the IF signal 23 to the first A/D converter 28 and feeds a second version of the IF signal 23 to the second A/D converter 30. The first A/D converter 28 is preferably operated at a first clock rate determined by the first clock source (fclock1) 50 in response to the processor 36. The second A/D converter preferably operates at a second clock rate determined by the second clock source (fclock2) 51 in response to the processor 36. The first A/D converter 28 digitizes the IF signal 23 to produce a digitized signal 29 and the second A/D converter 30 digitizes the IF signal 23 to produce a second digitized signal 31. Preferably, the first and second digitized signals 29 and 31, each carry one or more communication channels. The first digitized signal 29 is then frequency down converted by the digital downconverter 38 to produce a first digital down converted signal 39. Similarly the second digital downconverter 40 down converts the digital signal 31 to produce a second digital downconverted signal 41.

The detector 42 receives the first digital down converted signal 39 and performs a first signal quality measurement 43 of the signal 39. The signal quality measurement 43 is indicative of the signal quality of the digitized signal. Similarly, the detector 44 performs a second signal quality measurement 45 of the second digital down converted signal 41. The first signal quality measurement 43 and the second signal quality measurement 45 are received by the comparison module 46. The comparison module selects either the first digital down converted signal 39 or the second digital down converted signal 41 based on a comparison of the first signal quality measurement 43 and the second quality measurement 45. The selection module 52 in response to the comparison module 46 then outputs the selected digitally down converted signal 48. In accordance with one embodiment of the present invention, the digitally down converted signal 48 is either the first digital down converted signal 39 or the second digital downconverted signal 41. In accordance with another embodiment, the digitally down converted signal 48 may be a combination of the first and second digitally down converted signals 39, 41.

In the preferred embodiment, the RF downconverter 22 includes a mixer such as a Watkins Johnson, HDMII model mixer, and the oscillator 24 is a MC145151FN2 synthesizer IC with a MC12073A prescalar integrated circuit (IC), both available from Motorola, in conjunction with a voltage controlled oscillator set to a desired injection frequency. The first A/D converter 28 is preferably an Analog Devices A/D 9042 operating at a clock rate of 61.44 Mhz. The second A/D converter 30 is preferably an Analog Devices A/D 9042 operating at a rate of 61.60 Mhz. The first and second digital down converters 38, 40 and NCOs 32 and 34 are preferably each provided by a Harris Corp. HSP50016 digital downconverter which includes NCO functionality internally. The detectors 42 and 44 may be of various types depending on the particular application of the apparatus 10. For example, in an advanced mobile phone system (AMPS) type cellular system, detectors 42 and 44 are preferably supervisory audio tone (SAT) detectors where the output of the SAT detectors would provide inputs to a SAT comparator in the comparison module 46. However, in a time division multiple access (TDMA) type of cellular system, detectors 42 and 44 are preferably correlator type detectors and the detectors 42 and 44 would be correlated with a predefined synchronization word for a selected time slot and preferably include a bit error rate measurement to determine the quality 43 and 45 respectively. The processor 36 is preferably a MC68302 processor from Motorola.

It should be noted that by operating the first A/D converter 28 at a different clocking rate than the second A/D converter 30, the corresponding digital downconverters 38 and 40 are preferably tuned to different respective frequencies to receive the desired channels of the signals 29 and 31. By operating the first and second converters 28, 30 at differing rates the apparatus 10 increases dynamic range of the detected signal 23. Dynamic range of the detected signal 23 is increased since intermodulation products inherent in the digitization process within the A/D converters 28 and 30 are frequency shifted in output signals 29 and 31 due to the different clocking rates of the A/D converters 28 and 30.

Figure 2:
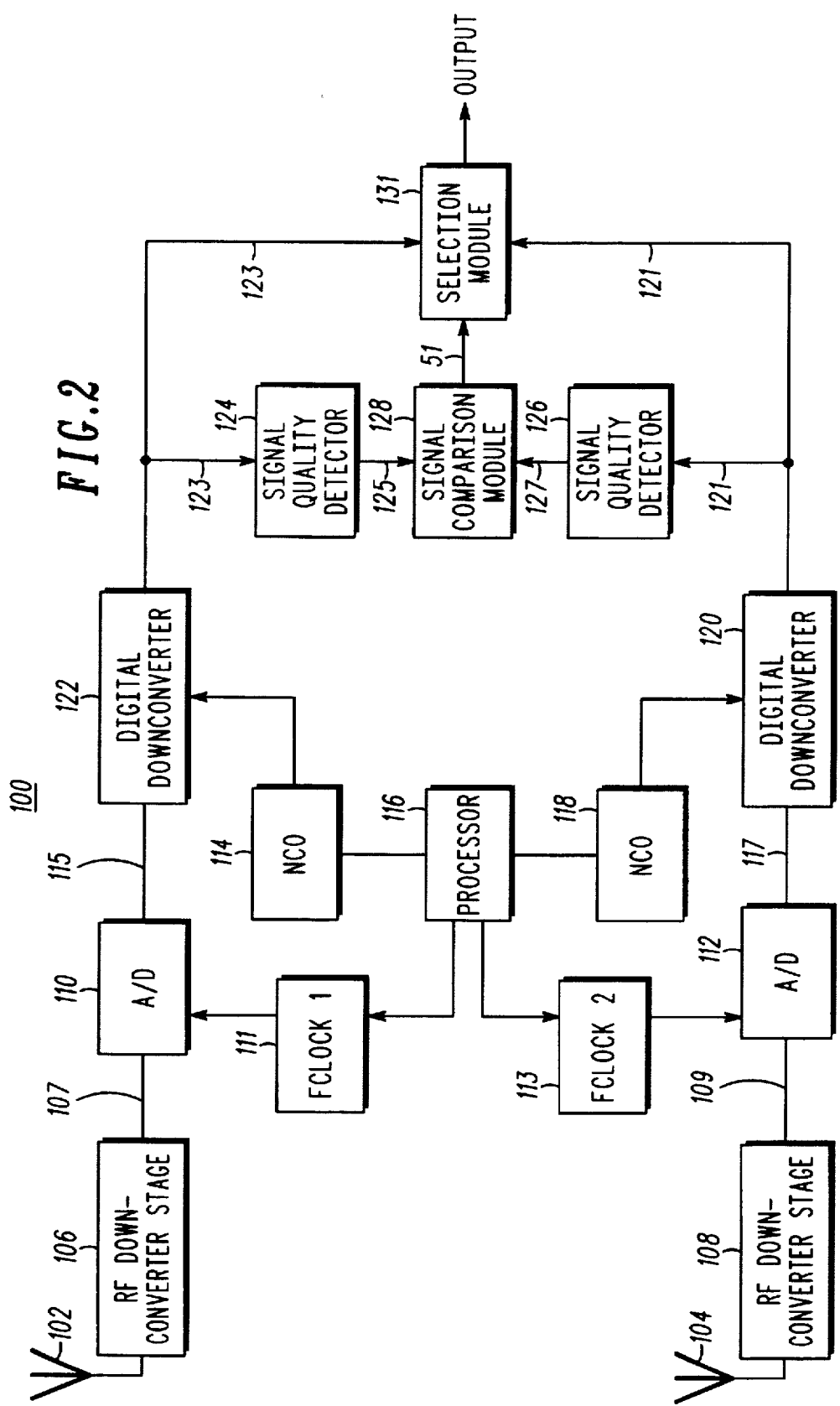
FIG. 2 is a block diagram of another embodiment of an apparatus for digitizing and detecting a received signal.

Referring now to FIG. 2, another preferred embodiment of an apparatus 100 for detecting and digitizing a received signal is disclosed. The apparatus 100 includes a first antenna 102 and a second antenna 104. The apparatus 100 also includes a first RF downconverter stage 106 and a second RF downconverter stage 108. The first RF downconverter stage 106 produces an intermediate frequency signal 107, and the second RF downconverter stage 108 produces a second intermediate frequency signal 109. The apparatus 100 also includes first and second analog to digital converters 110, 112, first and second numerically controlled oscillators 114, 118, first and second digital downconverters 122, 120, first and second signal quality detectors 124, 126, a processor 116, a signal comparison module 128, and a selection module 131. Generally, the preferred embodiment of apparatus 100 has the same components and operates as described above with respect to the apparatus 10 of FIG. 1. However, the apparatus 100 further includes a second antenna 104 and a second RF downconverter stage 108. The RF downconverter stage 108 is substantially similar to the RF downconverter stage 106, which preferably includes a mixer, an oscillator, and other conventional devices known to those of ordinary skill in the art. By providing a second antenna and a second RF downconverter stage 108, the apparatus 100 allows for diversity reception of the received signal. Diversity reception provides improved detection in a receiver as is well known in the art.

Figure 3:
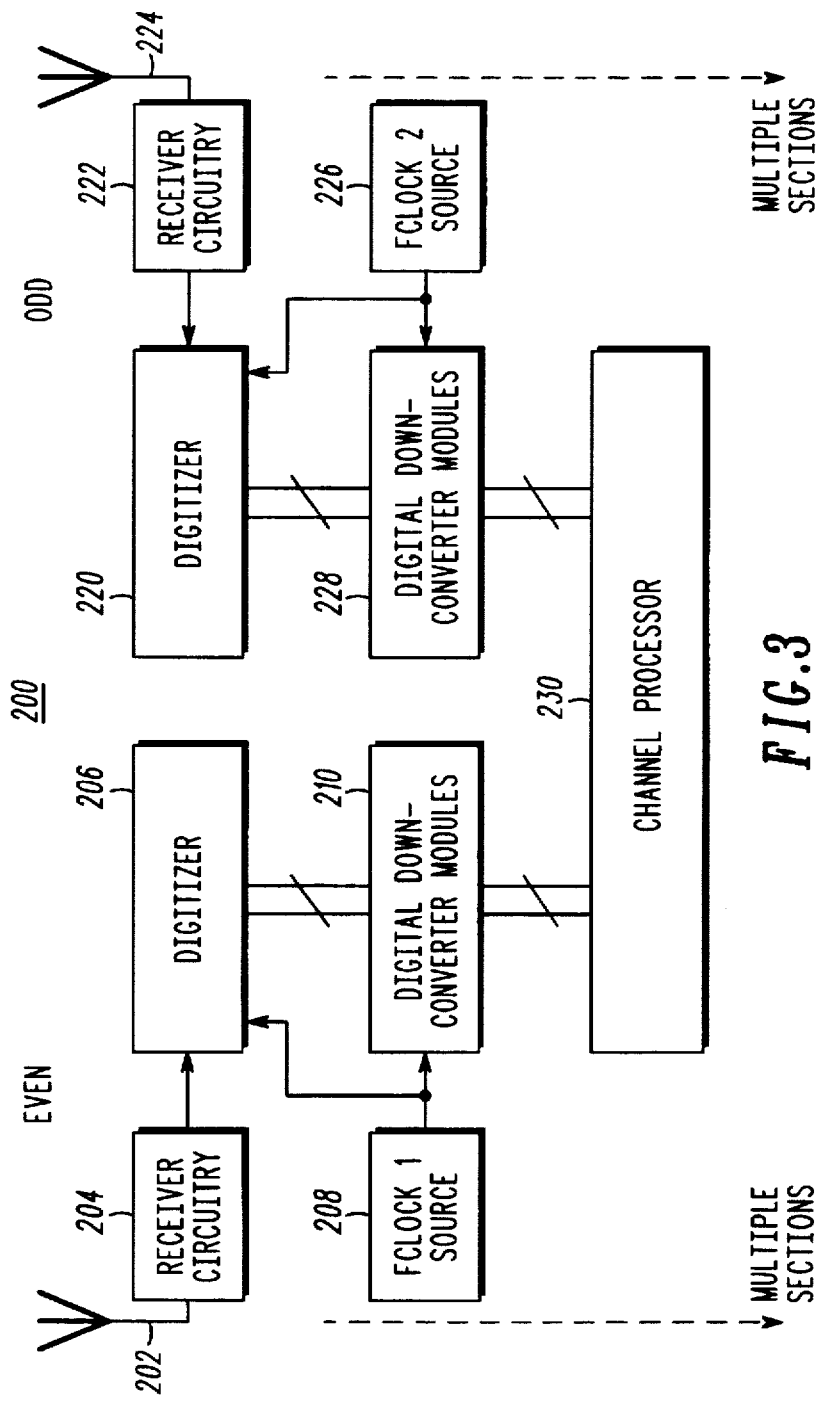
FIG. 3 is a block diagram of an embodiment of a multichannel radio frequency receiver.

Referring to FIG. 3, a preferred embodiment of a wideband multichannel receiver is illustrated. The wideband receiver 200 includes a plurality of modules grouped into a first group, referred to as an even group, and a second group referred to as an odd group. The even group includes a plurality of antennas 202, receiver circuits 204, digitizers 206, a first clock source 208, and digital downconverter modules 210. Similarly, the odd group includes a plurality of antennas 224, receiver circuits 222, digitizers 220, digital downconverters 228, and a second clock source 226. A channel processor or preferably a plurality of processors 230 receives data from each of the digital downconverters 210, 228 in each of the even and odd groups.

The first clock source 208, preferably a digitizer encode clock or sampling clock, is set to a different rate than the second clock 226. Data output from the digitizer 206 is fed to at least one digital downconverter (DDC) within the digital downconverter module 210 and data output from the digitizer 220 is fed to DDC 228. Each DDC within DDC modules 210, 228 digitally mixes to baseband, a desired channel embedded in wideband data received from the respective digitizer 206, 220 by applying a signal generated by a respective NCO, such as NCO 32, in the DDC 210. Another function performed by each DDC 210, 228 is decimation/filtering. The decimation filtering process provides channel filtering and rate reduction necessary for each individual channel. A lower sample rate is possible and often times desirable since the bandwidth of the individual baseband signals is usually less than the wideband spectrum. Due to unequal sample rates of the wideband data between a first branch including the digitizer 206 and the DDC 210 and a second branch including digitizer 220 and DDC 228, the frequency and decimation ratio used for a given communication channel is different between the branches so that a desired channel is converted to its baseband equivalent at a sample rate of equal value for all branches. Of course the baseband sampling rate does not have to be the same for each channel, but may be chosen based on the channel bandwidths of the desired receive channels. For multiple channels of equal bandwidth such as cellular Advanced Mobile Phone System (AMPS) channels it would be desirable to have the same sample rate for each channel.

The baseband data for each channel from each branch is passed to the channel processor 230, and the channelized data from each branch is analyzed for possible interference from spurious signals. When interference on a particular channel for a branch is detected, that branch is not used in the combining process for that channel. The channel processor 230 also performs such functions as demodulation, data detection, and bit and word error rate measuring.

In sectorized antenna applications, a plurality of wideband receivers connected to the antennas 224, designated as odd group receivers, utilize digitizers at one encode rate while those receivers connected to the antennas 202, designated as even group receivers, utilize digitizers of another encode rate. By way of example and referring to FIG. 3, consider a 3 sector cellular system made up of AMPS channels. Two receive antennas are used per sector for a total of 6 antennas. Six wideband receiver digitizers are used, one per antenna. Three of the receive digitizers 220 are grouped to the odd antennas 224 and use a sampling clock of 61.44 Mhz. These will be referred to as the odd digitizers. The other three (even digitizers) 206 are tied to the respective even antennas 202 and use a sampling clock of 61.60 Mhz. Wideband data at 61.44 Mhz from each of the odd digitizers 220 is passed to a block of DDCs 228. The number of DDCs depends on the number of desired AMPS channels for the cell. Each DDC 228 takes the 61.44 Mhz data from the appropriate digitizer 220, and converts the embedded desired AMPS channels to baseband using the steps described above. In the process, other channels are filtered out, leaving the desired channels. If the desired sample rate for the AMPS baseband data is 80 Ksamples/sec., the required decimation ratio in this case would be 61.44 Mhz/80 Khz=768.

Similarly, wideband data at 61.60 Mhz from each of the even digitizers 206 is passed to another block of DDCs 210. These DDCs 210 perform the same function on the even branches as described for the odd branches. If the desired sample rate for the baseband data of the even branches is also 80 Ksamples/sec., the decimation ratio is 770 (61.60 Mhz/80 Khz). Data from each individual DDC 210, 228 is passed along to the channel processor 230 where odd and even data for each channel is analyzed for interference. If a spurious response in the even branch falls on a channel used in that sector, the channel data for the odd branch will be chosen and diversity will not be implemented while the spurious response is present. Likewise, if a spurious response in the odd branch is detected, the channel data for the even branch will be chosen.

Figure 4:
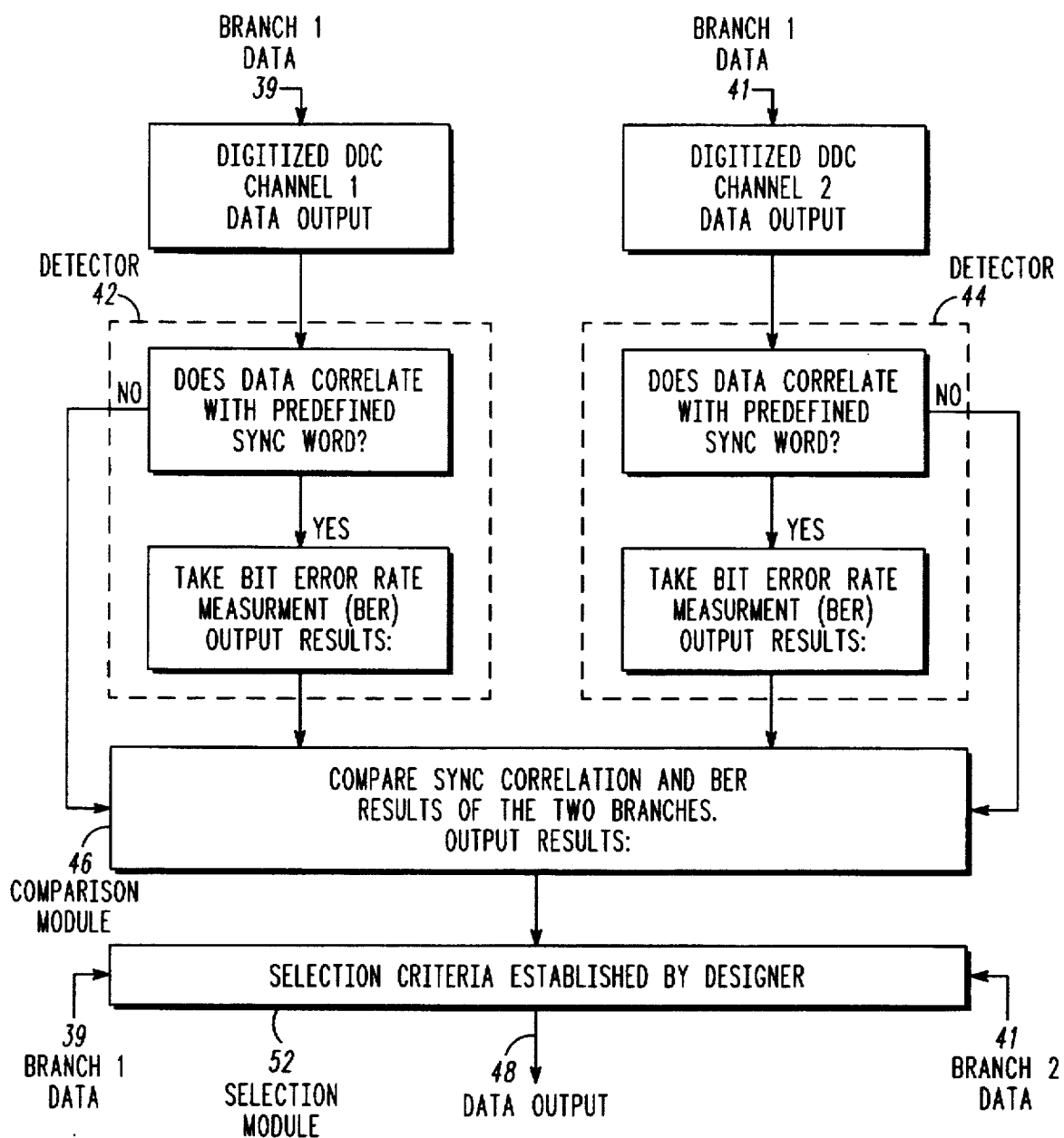
FIG. 4 is a diagram illustrating operation of the apparatus of FIG. 1.

Referring to FIG. 4, an example in which the preferred embodiment is operating on an uplink traffic channel in a digital mobile telephone system as outlined by the Personal Digital Cellular Telecommunication System RCR STD-27D document, available from Research & Development Center for Radio Systems at 1-5-16 Toranomon, Minato-ku, Tokyo 105 Japan, is illustrated. For this example, it is assumed the product in which this preferred embodiment is used meets the standards and specifications established by the RCR STD-27D document enabling proper performance in the associated cellular system.

A detailed description of a preferred embodiment for the functions included in the detector blocks 42 and 44, the comparison module 46, and the selection module 52 is provided. These blocks 42, 44, 46, and 52 may be incorporated in a microprocessor, such as the Motorola MC68302. A person of ordinary skill in the art may program the MC68302 to perform the tasks that are described in the following text Branch 1 data signal 39 is comprised of the first digital down converter (DDC) 38 output. Branch 2 data signal 41 is comprised of the second digital down converter (DDC) 40 output. Within detector module 42 a branch 1 traffic channel sync word is correlated to a predefined sync word as established in the RCR STD-27D document which is incorporated by reference herein. In detector module 44, a branch 2 traffic channel sync word is correlated to a predefined sync word as established in the RCR STD-27D document. If sync correlation for either of the branches does not occur, the traffic channel for that branch is no longer valid or the signal is assumed corrupted by an interferer of the RF input signal level for that branch or is below the sensitivity level of the receiver. If valid sync word correlation results are received from the respective branches, a corresponding bit error rate (BER) measurement can be made on all of the non-traffic channel bits. Branch 1 correlation results are sent to comparison module 46 and compared with correlation results received from branch 2. Note that an exemplary uplink traffic channel bit assignment is described in section 4.1.4.3.2 of RCR STD-27D. The measurement results are provided by comparison module 46 which compares the information received from the branch 1 data to the information received from branch 2 data.

There are many criteria that may be used to select which branch data, either branch 1 or 2, shall be further processed and applied to the selection module output 48 that comply with the requirements of the RCR STD-27D.

An example of appropriate selection criteria is where sync word correlation has occurred and a predetermined BER threshold must be exceeded. More specifically, if sync word correlation occurs and BER passes for both branches, both branch signals can be combined for further processing. If two antennas are used as in FIG. 2, this would result in diversity gain. If branch 1 sync word correlation occurs and branch 1 BER passes in a predetermined threshold and either branch 2 sync word correlation does not occur or branch 2 sync word correlation does occur but branch 2 BER fails, branch 1 data would be selected for further processing. If branch 2 sync word correlation occurs and branch 2 BER passes a respective threshold and either branch 1 sync word correlation does not occur or branch 1 sync word correlation does not occur but branch 1 BER fails, branch 2 data would be selected for further processing. Although a particular method of selection has been described above, it is contemplated that many other selection methods may be used.

The preferred method and apparatus of digitizing and detecting a received RF signal as described above have many benefits. For example, the preferred embodiments increase the dynamic range level of received frequencies that would otherwise be limited by spurious interference, such as interference caused by the digitization process within an analog to digital converter. In addition, there is a reduced need for independent devices for reducing spurious signals since spurious signal reduction is accomplished by using multiple clocking rates. Another benefit is reduced gain in receiver branches. Further, substantially similar RF circuitry may be used in each of a plurality of receiver branches, thereby leading to economic manufacture and reduced costs.

Further advantages and modifications of the above described apparatus and method will readily occur to those skilled in the art. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method of digitizing and detecting a received signal comprising the steps of:
   digitizing a first radio frequency signal at a first clock rate to produce a first digitized signal;
   digitizing a second radio frequency signal at a second clock rate to produce a second digitized signal;
   performing a first signal quality measurement indicative of the signal quality of the first digitized signal, the first signal quality measurement comprising a synchronization measurement;
   performing a second signal quality measurement indicative of the signal quality of the second digitized signal, the second signal quality measurement comprising a synchronization measurement; and
   selecting at least one of the first and second digitized signals based on the first and second signal quality measurements.

2. The method of claim 1, wherein the signal quality measurement comprises a carrier to noise measurement.

3. The method of claim 1, further comprising frequency downconverting a received signal to produce at least one of the first and second radio frequency signals.

4. The method of claim 1, further comprising downconverting at least one of the first and second digitized signals prior to performing one of the first and second signal quality measurements.

5. The method of claim 1, further comprising processing the selected digitized signal.

6. A method of digitizing and detecting a received radio frequency, RF, signal comprising the steps of:
   detecting the RF signal;
   digitizing the RF signal at a first clock rate to produce a first digitized signal;
   digitizing the RF signal at a second clock rate to produce a second digitized signal;
   performing a first and a second signal quality measurement, each of the first and second signal quality measurements comprising a synchronization measurement indicating the signal quality of the respective first and second digitized signals; and
   selecting one of the first and second digitized signals based on the first and second signal quality measurements of the respective first and second digitized signals.

7. The method of claim 6, further comprising the steps of:
   comparing the first signal quality measurement to a threshold; and
   processing the first digitized signal when the first signal quality measurement exceeds the threshold.

8. The method of claim 6, further comprising the steps of:
   comparing the second signal quality to a threshold; and
   processing the second digitized signal when the second signal quality measurement exceeds the threshold.

9. An apparatus for digitizing and detecting a received signal comprising:
   a first analog to digital converter digitizing a first radio frequency signal at a first clock rate to produce a first digitized signal;
   a second analog to digital converter digitizing a second radio frequency signal at a second clock rate to produce a second digitized signal;
   a first measurement unit producing a first signal quality measurement indicative of the signal quality of the first digitized signal and producing a second signal quality measurement indicative of the signal quality of the second digitized signal, the first and second signal quality measurements comprising a synchronization measurements; and
   a comparison device selecting one of the first and second digitized signals based on the first and second signal quality measurements.

10. The apparatus of claim 9, wherein the signal quality measurement comprising a carrier to noise measurement.

11. The apparatus of claim 9, further comprising a RF downconverter frequency downconverting a received signal to produce at least one of the first and second radio frequency signals.

12. The apparatus of claim 9, further comprising a digital downconverter responsive to at least one of the first and second analog to digital converters.

13. The apparatus of claim 12, wherein the digital downconverter includes a numerically controlled oscillator.

14. A multichannel radio frequency (RF) receiver comprising:
   a first digitizer digitizing a first received multicarrier RF signal at a first clock rate to produce a first digitized signal;
   a second digitizer digitizing a second receiver multicarrier RF signal at a second clock rate to produce a second digitized signal;
   a first digital downconverter responsive to the first digitizer, the first digital downconverter receiving the first digitized signal and producing a first digitally downconverted signal;
   a first clock source coupled to the first digitizer and the first digital downconverter;
   a second digital downconverter responsive to the second digitizer, the second digital downconverter receiving the second digitized signal and producing a second digitally downconverted signal;
   a second clock source counted to the second digitizer and the second digital downconverter; and
   a channel processor responsive to the first and second digital downconverters.

15. The multichannel receiver of claim 14, further comprising a plurality of digitizers and a first plurality of digital downconverters.

16. The multichannel receiver of claim 15, further comprising a plurality of receiver circuits coupled to the first plurality of digitizers.

17. The multichannel receiver of claim 16, further comprising a plurality of antennas coupled to the first plurality of digitizers.

* * * * *